United States Patent Office 2,733,269
Patented Jan. 31, 1956

2,733,269

CHLORINATION

William A. Raimond, North Plainfield, and Leslie L. Perry, Plainfield, N. J., assignors to American Cyanamid Company, New York, N. Y., a corporation of Maine No Drawing. Application April 23, 1953,
Serial No. 350,768

12 Claims. (Cl. 260—578)

This invention relates to an improved process of chlorinating nitranilines, and more particularly p-nitraniline.

P-nitraniline is chlorinated on an extensive scale to produce o-chloro-p-nitraniline. One procedure is to employ sodium hypochlorite and sulfuric acid. This process works but has some disadvantages, notably the relatively long time required for the completion of the chlorination. This adds to the cost of the process and is undesirable because the strong reagents used tend to attack the final products because of the long reaction time.

According to the present invention, we have found that a smoother and much more rapid chlorination results if various chlorides are added to the reaction mixture. Chlorides of the alkali metals, ammonia, and the metals of group 2 give satisfactory results. Chlorides of metals of group 1B, such as cupric chloride, and of polyvalent metals, such as aluminum chloride, do not give satisfactory results. It is not known why the addition of a chloride should improve the chlorination. The reason for the improved speed and smoothness of the reaction is therefore not intended to be limited to any particular theory of why this desirable result is obtained.

The proportions of hypochlorite and nitraniline are not materially changed by the addition of the chlorides which constitute the novel feature of the present invention. In the past, substantially stoichiometrical proportions were used with a very slight excess of hypochlorite and the same proportions give good results in the present invention. The amount of hypochlorite is not critical, although of course, too great excesses should be avoided as a large excess of chlorinating agent can result in the production of undesired products. In this respect, however, the present invention does not differ in its requirements than that which was hitherto known. The cation of the hypochlorite is not critical and the hypochlorites of the alkali and alkaline earth metals are usable. Because of its low cost and ready availability sodium hypochlorite is preferred but it is effective not because of the sodium cation, and it is understood that the invention is not limited to the use of sodium hypochlorite but includes the other ordinary hypochlorites which do not introduce cations that adversely affect the process.

The amount of added chloride is not critical. It is however not catalytic and in general will range from approximately stoichiometrical amounts to moderate excesses. Excellent results are obtained when the added chloride is in approximately twice stoichiometrical amounts based on the nitraniline.

It is an advantage of the present invention that the temperature is not critical and does not differ from that used in the old process in which no chlorides were added. In general, temperatures approximating room temperature are desirable, but somewhat higher temperatures may be used and of course lower temperatures may also be employed, although when the temperature is too low, the rate of reaction decreases and so some of the advantage of the present invention is lost. In any event, the temperature does not differ from that used in the process formerly employed and temperature is not a differentiating feature of the present invention.

The invention will be described in greater detail in conjunction with the following specific examples, in which the parts are by weight unless otherwise specified.

*Example 1*

84 parts of 98% sulfuric acid is mixed with 350 parts of water, the temperature being kept at about 30° C. Thereupon the temperature is raised to 50° C. and 40 parts of p-nitraniline stirred in until a smooth slurry is obtained. Then 34 parts of sodium chloride is added gradually. After the addition of the sodium chloride the temperature is reduced to room temperature and 20.7 parts of sodium hypochlorite in solution are gradually added. The rate of addition is maintained sufficiently low so that loss of chlorine in gaseous form to the air is avoided. When the reaction is complete, the o-chloro-p-nitraniline produced is filtered and the cake washed acid free to Congo red, and dried at 60° C. A very high yield is obtained.

*Example 2*

The procedure of Example 1 is followed, the sodium hypochlorite being replaced with an equivalent amount of calcium hypochlorite and sodium chloride with an equivalent amount of barium chloride. Sulfates of the alkaline earth appear in the final product and may be permitted to remain where the use is not adversely affected by their presence.

*Example 3*

The procedure of Example 1 is followed replacing the sodium chloride with an equivalent amount of potassium chloride. The reaction proceeds smoothly and the same high yield is obtained.

*Example 4*

The procedure of Example 1 is followed omitting the sodium chloride. In order to obtain an adequate yield the reaction time is increased at least 50% over the time required in Examples 1 to 3.

*Example 5*

The procedure of Example 1 is followed replacing the sodium chloride with ammonium chloride. An excellent yield of o-chloro-p-nitraniline is obtained and the reaction time is substantially the same as in Examples 1 to 3.

*Example 6*

The procedure of Example 1 is followed substituting magnesium chloride for the sodium chloride, the same high yield is obtained and the same short reaction time holds.

*Example 7*

The procedure of Example 1 is followed replacing the sodium chloride with zinc chloride. The reaction proceeds in the same manner and in the same short time resulting in an excellent yield of o-chloro-p-nitraniline.

*Example 8*

84 parts of 98% sulfuric acid is mixed with 350 parts of water, the temperature being kept at about 30° C. Thereupon the temperature is raised to 50° C. and 40 parts of o-nitraniline stirred in until a smooth slurry is obtained. Then 34 parts of sodium chloride is added gradually. After the addition of the sodium chloride the temperature is reduced to room temperature and 20.7 parts of sodium hypochlorite in solution are gradually added. The rate of addition is maintained sufficiently low so that loss of chlorine in gaseous form to the air is avoided. When the reaction is complete, the p-chloro-o-nitraniline produced is filtered and the cake washed acid free to Congo red, and dried at 60° C. An excellent yield is obtained.

*Example 9*

The procedure of Example 8 is followed omitting the sodium chloride. In order to obtain adequate yield the reaction time is increased at least 50% longer than the time required in Example 8.

*Example 10*

The procedure of Example 1 is followed replacing the sodium chloride with an equivalent amount of calcium chloride. The reaction proceeds in the same manner and in the same sort time resulting in satisfactory yield of o-chloro-p-nitraniline. The product, as is to be expected, is contaminated with calcium sulfate.

We claim:

1. In a process of chlorinating mononitranilines by reaction with sulfuric acid and a hypochlorite, the improvement which comprises carrying out the reaction in the presence of at least substantially stoichiometric amounts of a chloride of a cation selected from the group consisting of alkali metals, metals of group 2 of the periodic system having an atomic number less than 88 and ammonium.

2. A process to claim 1 in which the chloride is sodium chloride.

3. A process according to claim 2 in which the amount of sodium chloride is in excess of the stoichiometrical equivalent based on the nitraniline.

4. A process according to claim 3 in which the hypochlorite is sodium hypochlorite.

5. In a process of chlorinating p-nitranilines by reaction with sulfuric acid and a hypochlorite, the improvement which comprises carrying out the reaction in the pressure of at least substantially stoichiometric amounts of a chloride of a cation selected from the group consisting of alkali metals, metals of group 2 of the periodic system having an atomic number less than 88 and ammonium.

6. A process according to claim 5 in which the chloride is sodium chloride.

7. A process according to claim 6 in which the amount of sodium chloride is in excess of the stoichiometrical equivalent based on the p-nitraniline.

8. A process according to claim 7 in which the hypochlorite is sodium hypochlorite.

9. In a process of chlorinating o-nitranilines by reaction with sulfuric acid and a hypochlorite, the improvement which comprises carrying out the reaction in the presence of at least substantially stoichiometric amounts of a chloride of a cation selected from the group consisting of alkali metals, metals of group 2 of the periodic system having an atomic number less than 88 and ammonium.

10. A process according to claim 9 in which the chloride is sodium chloride.

11. A process according to claim 10 in which the amount of sodium chloride is in excess of the stoichiometrical equivalent based on the o-nitranilines.

12. A process according to claim 11 in which the hypochlorite is sodium hypochlorite.

No references cited.